(12) United States Patent  
Rowland

(10) Patent No.: US 6,434,982 B1
(45) Date of Patent: Aug. 20, 2002

(54) LOCK FOR TRACTOR TRAILER LANDING GEAR

(76) Inventor: James E. Rowland, 2717 W. 10th St., Lakeland, FL (US) 33805-3909

(*) Notice: Subject to any disclaimer, the term of this patent is extended or adjusted under 35 U.S.C. 154(b) by 0 days.

(21) Appl. No.: 09/668,355

(22) Filed: Sep. 25, 2000

Related U.S. Application Data

(60) Provisional application No. 60/162,127, filed on Oct. 29, 1999.

(51) Int. Cl.⁷ ............................................... B60R 25/02
(52) U.S. Cl. .............................. 70/211; 70/232; 70/164; 70/14; 70/258
(58) Field of Search ................................ 70/14, 18, 19, 70/201–203, 235, 237, 229–232, 158, 164, 211, 212, 258

(56) References Cited

U.S. PATENT DOCUMENTS

| | | | |
|---|---|---|---|
| 3,245,240 A | * 4/1966 | DeForrest | 70/209 |
| 3,605,457 A | * 9/1971 | Foster | 70/14 |
| 3,837,191 A | * 9/1974 | Soiderer | 70/158 X |
| 4,630,456 A | * 12/1986 | Nielsen, Jr. | 70/232 |
| 4,730,468 A | 3/1988 | Becker | 70/34 |
| 4,781,042 A | * 11/1988 | Stephens | 70/14 |
| 5,351,511 A | * 10/1994 | Bernier | 70/232 |
| 5,375,916 A | * 12/1994 | Cook | 70/232 X |
| 5,421,601 A | * 6/1995 | Hinze et al. | 70/232 X |
| 5,426,961 A | 6/1995 | Rimbaud et al. | 70/237 |
| 5,448,842 A | * 9/1995 | Sonstroem | 70/159 X |
| 5,469,721 A | * 11/1995 | Pyle | 70/14 |
| 5,520,030 A | 5/1996 | Muldoon | 70/14 |
| 5,775,139 A | 7/1998 | Sellers | 70/14 |
| 5,782,115 A | 7/1998 | Judy | 70/164 |
| 5,904,342 A | 5/1999 | Laarman | 254/419 |
| 6,076,380 A | * 6/2000 | Hulak | 70/14 |

FOREIGN PATENT DOCUMENTS

GB        1 565 542        4/1980

* cited by examiner

Primary Examiner—Suzanne Dino Barrett
(74) Attorney, Agent, or Firm—Richard C. Litman

(57) ABSTRACT

A lock for securing a lowered or non-lowered landing gear of a tractor trailer comprising two hinged interlocking halves secured by a keyed locking cylinder which has a pin intersecting apertures in flanges of the halves.

3 Claims, 3 Drawing Sheets

LOCK FOR TRACTOR TRAILER LANDING GEAR

CROSS-REFERENCE TO RELATED APPLICATION

This application claims the benefit of U.S. Provisional Patent Application Ser. No. 60/162,127, filed Oct. 29, 1999.

BACKGROUND OF THE INVENTION

1. Field of the Invention

The present invention relates generally to locks. More specifically, the invention is a lock for a landing gear handle of a tractor trailer, made up of two hinged parts configured to fit around the landing gear handle, and locked with a shaft-type keyed lock.

2. Description of Related Art

There is a need for a durable but relatively inexpensive lock to prevent theft of parked trailers in a drop yard or depot. Loaded trailers when left in a drop yard which uses yard trucks to move trailers about prevent the conventional use of air locks and King pin locks. The yard truck moves the trailers by lifting the trailer up with the use of hydraulic apparatus with the landing gear up or down. King pin locks are greasy and messy to use and store.

The related art of interest describes various locking means for hitches and landing gear of trailers, but none discloses the present invention. The related art will be discussed in the order of perceived relevance to the present invention.

U.S. Pat. No. 5,782,115 issued on Jul. 21, 1998, to Danny L. Judy describes an anti-theft security device for locking the dolly-leg crank arm of trailers with a unitary housing having a flattened locking bar traversing a slot in the housing and preventing the housing from being detached from the crank arm. The bar has an aperture on an end for a keyed lock from which extends a chain which wraps around the dolly leg and crank. The chain is wrapped around the crank handle, extends through two lock chain guide harness rings and ends on a welded ring on the bottom of the housing. The device is distinguishable for its external keyed lock and chain.

U.S. Pat. No. 5,775,139 issued on Jul. 7, 1998, to Fred J. Sellers describes a steel trailer hitch lock comprising a housing with a mounting ball on the base plate which has hinged to it two right-angled side locking plates which intermesh on top and lock with a locking pin and a cylinder lock. The trailer hitch lock is distinguishable for its limitation to locking trailer hitch balls.

U.S. Pat. No. 5,520,030 issued on May 28, 1996, to John e. Muldoon describes a gooseneck trailer locking apparatus is formed by a pair of elongated and telescoping members having a hitch ball and chain lock at one end for connection with the king pin of a gooseneck trailer. The other of the of the telescoping members is provided with a clevis element lockably closely surrounding the depending portion of a trailer leveling and supporting jack by a clevis arm and lock securing the clevis to the jack. The apparatus is distinguishable for its dissimilar structure.

U.S. Pat. No. 5,426,961 issued on Jun. 27, 1995, to Pierre Rimbaud et al. describes an anti-theft security device for trailers comprising a security lock integrated to a mechanism actuating the props of trailers. The mechanism acts mechanically by preventing the gears from meshing or by blocking a bevel gear and by disrupting the supply of electricity. The device is distinguishable for having moving mechanical elements and an electrical locking element.

U.S. Pat. No. 4,730,468 issued on Mar. 15, 1988, to Milton Becker describes a locking pin for a telescoping landing gear of a semi-truck trailer, which pin intersects and prevents the lower inner cylinder from retracting. The locking pin comprises a shank with a head and a cog on one end and a lock at the opposite end locked by a key. The locking pin device is distinguishable for its singular function and structure.

U.S. Pat. No. 5,904,342 issued on May 18, 1999, to Gregory A. Laarman describes a landing gear crank handle adapted to lock into a collapsed position, a partially extended position, and a fully extended position. The landing gear crank handle is distinguishable for being limited to a specific crank handle structure.

U.K. patent application Ser. No. 1,565,542 published on Aug. 23, 1977, for Ronald T. Blakelock describes a security device for a semi-trailer leg comprising a key operated lock mechanism located inside the upper leg to prevent the pinion shaft from rotating to raise or lower the lower leg. The security device is distinguishable for its internal locking mechanism.

None of the above inventions and patents, taken either singly or in combination, is seen to describe the instant invention as claimed.

SUMMARY OF THE INVENTION

The invention is a lock for securing a lowered or non-lowered landing gear of a tractor trailer comprising two hinged interlocking halves secured by a keyed locking cylinder which has a pin intersecting apertures in flanges of the halves.

Accordingly, it is a principal object of the invention to provide a locking device for immobilizing the landing gear of a tractor trailer whether it is extended or not to prevent theft.

It is another object of the invention to provide a locking device which immobilizes the landing gear of a tractor trailer even when the trailer is connected to the truck to prevent theft.

It is a further object of the invention to provide a locking device which houses the hinged portion of the crank handle to prevent theft.

Still another object of the invention is to provide a locking device which is hinged for housing the hinged portion of the crank handle and locked by a key to prevent theft.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
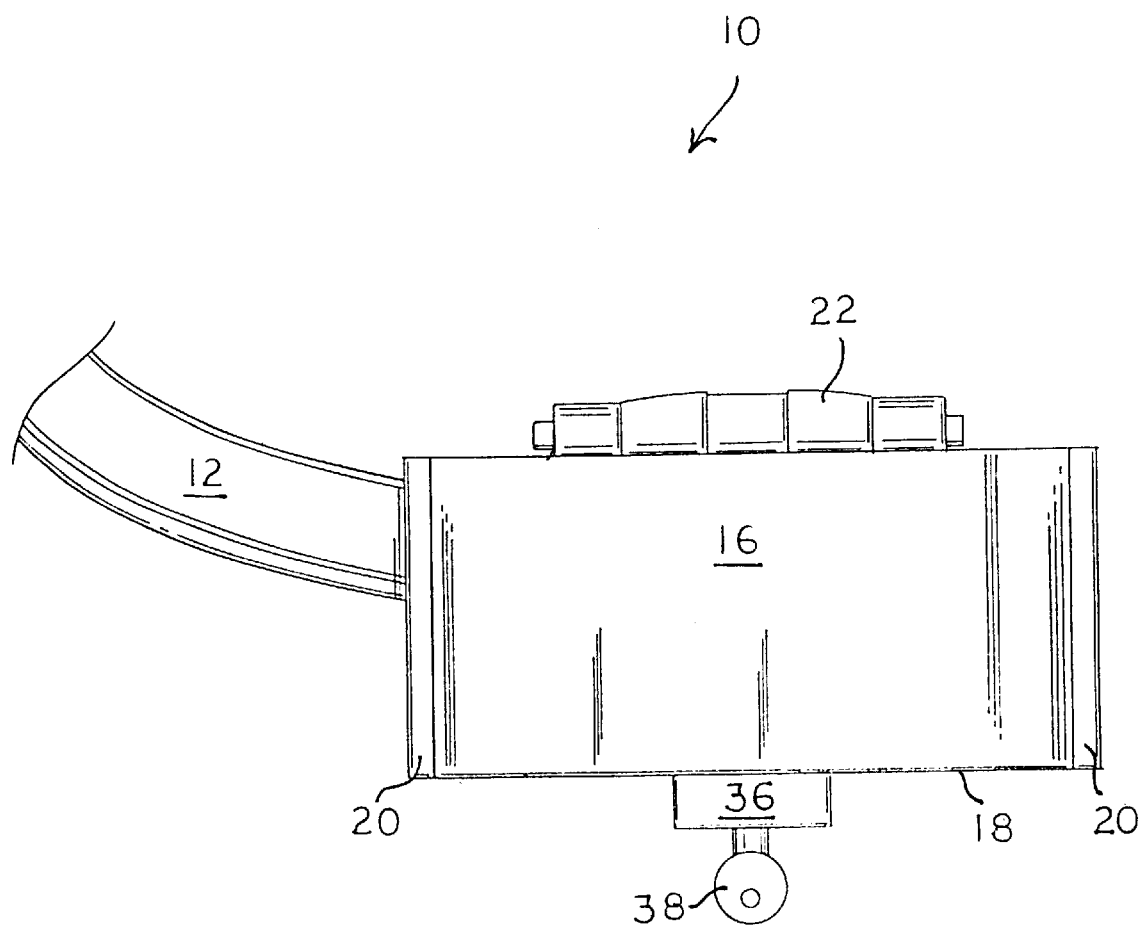
FIG. 1 is an environmental, front elevational view of a lock installed on a tractor trailer landing gear according to the present invention.
Figure 2:
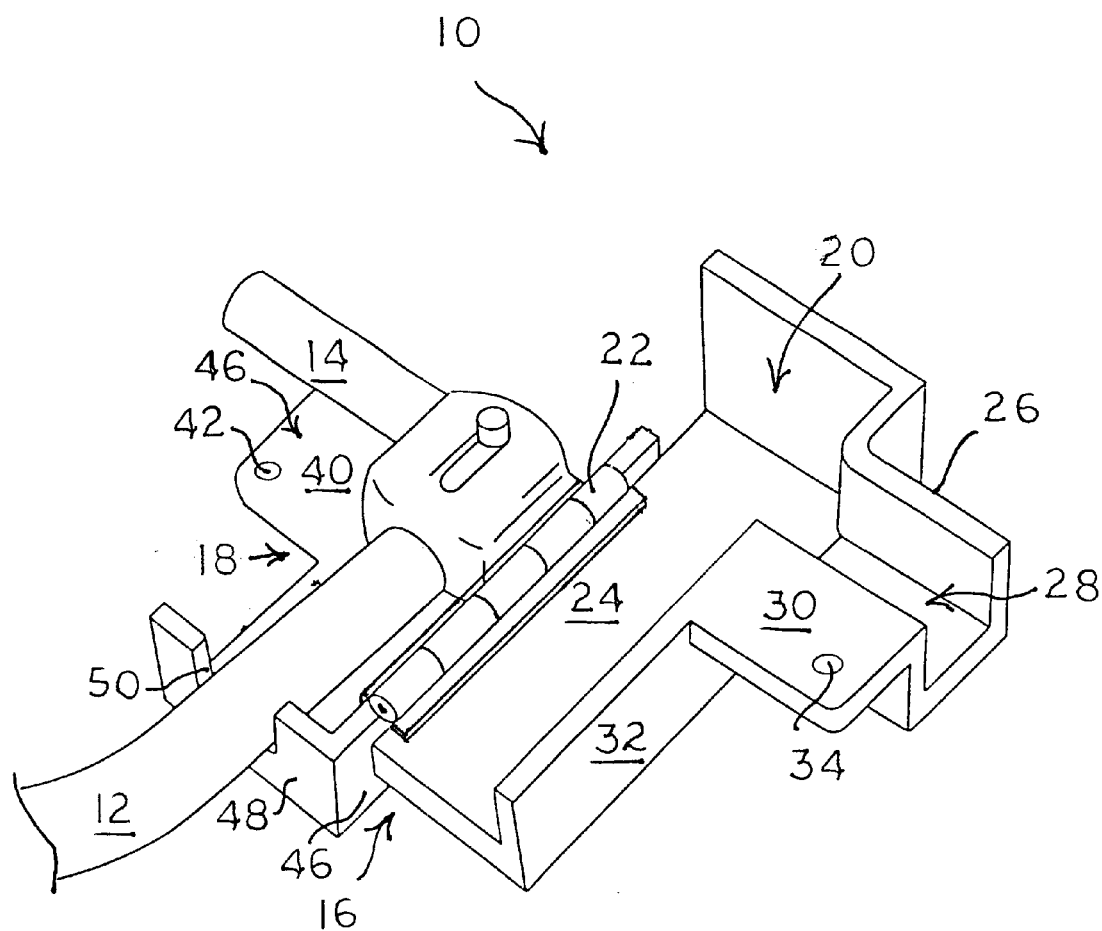
FIG. 2 is a perspective view of the lock being installed.
Figure 3:
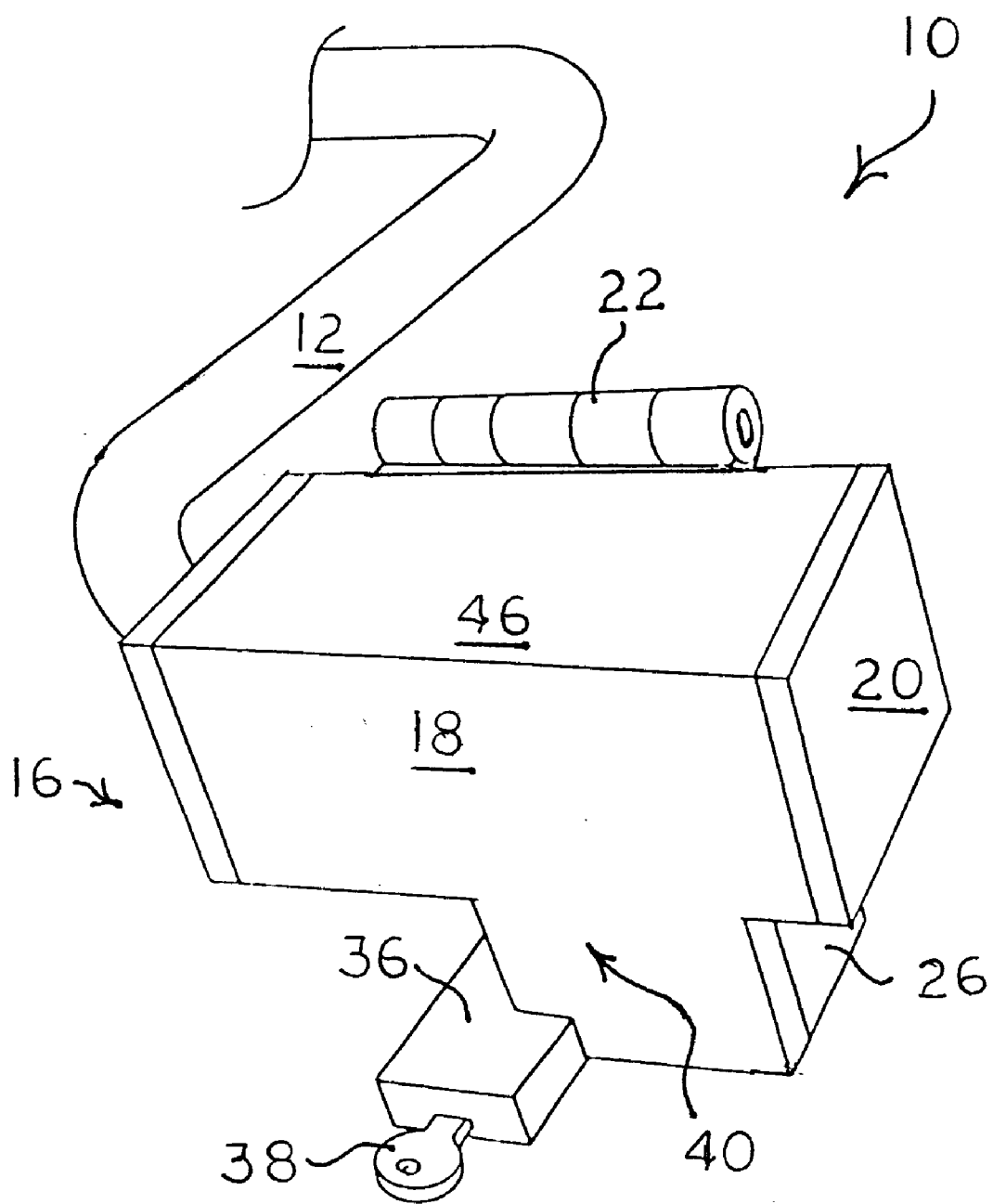
FIG. 3 is a perspective view of an opened lock.

The present invention illustrated in FIGS. 1, 2 and 3 is directed to a lock device 10 for preventing access to the landing gear of a tractor trailer whether it is lowered or not and whether the trailer is connected to the tractor or not. The crank handle 12 must be in a folded position relative to the dolly-leg crank arm 14 (FIG. 2) of the dolly-leg crank case. The lock housing 16 has a rectangular box configuration and is made of metal, preferably case hardened. The housing 16 consists of two mating but dissimilar halves 18 (front half element) and 20 (rear half element) joined by a metal hinge 22 having its legs welded to the inside of the housing 16 for increased tamper-proofing.

The rear half element 20 (FIG. 2) comprises a main rectangular wall portion 24 bounded by a stepped wall portion 26 on its right side joined by a channel 28 to a flange 30 extending out from the sidewall 32. It should be noted that there is no wall opposite the stepped wall portion 26 on the front half element 18. An aperture 34 is located on the flange 30 for cooperation with a locking pin (not shown) of the bar-shaped and notched locking cylinder element 36 locked by a key 38 (FIG. 3).

The front half element 18 (FIGS. 1 and 3) is designed to interfit the rear half element 20 and permit no access opening for prying open the lock device 10. The L-shaped main wall 40 has an aperture 42 on the extended portion 44 which is aligned with aperture 34 for locking purposes. A rectangular wall portion 46 is connected by hinge 22 to the rectangular wall portion 24 of the rear half element 20. An end wall 48 with a cutout portion 50 completes the structure of the front half element 18.

The locking cylinder element 36 has a rectangular bar configuration (not shown entirely) with a notch or slot for accepting the portions of the front half and rear half elements 18, 20, respectively, and to support a lock pin which would penetrate the apertures 34, 42. Thus, the lock device 10 is securely attached to the crank handle 12 and the dolly-leg crank arm 14 to prevent the movement of the landing gear of a tractor- or semi-trailer.

It is to be understood that the present invention is not limited to the sole embodiment described above, but encompasses any and all embodiments within the scope of the following claims.

I claim:

1. A lock device for preventing access to a landing gear of a tractor trailer having a crank handle extending from a dolly-leg crank arm and in a folded position comprising:

a rectangular steel box comprising a front half portion and a rear half portion, and a hinge joining the portions together;

said front half portion comprising an L-shaped main wall having an extended portion with a first aperture in an exposed corner and an end wall with a cutout;

said rear half portion comprising a main rectangular wall bounded by a stepped wall and a sidewall joined by a channel having a flange having a second aperture extending from said sidewall; and a key operated bar-shaped metal locking cylinder element having a pin in a notch for penetrating said first and second apertures of said front and rear half portions when joined around said folded crank handle and dolly-leg crank arm to prevent unauthorized access to the landing gear.

2. The lock device according to claim 1, wherein the lock device is made from case hardened steel.

3. The lock device according to claim 1, wherein the hinge has legs positioned inside the steel box.

* * * * *